(12) United States Patent
Hamm

(10) Patent No.: US 12,703,101 B2
(45) Date of Patent: Aug. 11, 2026

(54) AUTOMATED CALIBRATION OF A PRODUCTION MACHINE

(71) Applicant: Siemens Aktiengesellschaft, Munich (DE)

(72) Inventor: Carsten Hamm, Eggolsheim (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 18/575,670

(22) PCT Filed: May 31, 2022

(86) PCT No.: PCT/EP2022/064695
§ 371 (c)(1),
(2) Date: Dec. 29, 2023

(87) PCT Pub. No.: WO2023/274643
PCT Pub. Date: Jan. 5, 2023

(65) Prior Publication Data

US 2024/0308077 A1 Sep. 19, 2024

(30) Foreign Application Priority Data

Jun. 30, 2021 (EP) .................................... 21182869

(51) Int. Cl.
*B25J 9/16* (2006.01)

(52) U.S. Cl.
CPC ........... *B25J 9/1692* (2013.01); *B25J 9/1664* (2013.01)

(58) Field of Classification Search
CPC ...... B25J 9/1692; B25J 9/1664; B25J 9/1628; B25J 9/163; B25J 9/1653; B25J 9/1684;
(Continued)

(56) References Cited

U.S. PATENT DOCUMENTS

2004/0093119 A1* 5/2004 Gunnarsson ........... B25J 9/1638
700/245
2020/0306976 A1* 10/2020 Yuelai .................... B25J 9/1653
(Continued)

FOREIGN PATENT DOCUMENTS

DE 102010010920 A1 9/2011
EP 0353585 A2 2/1990
(Continued)

OTHER PUBLICATIONS

PCT International Search Report and Written Opinion of International Searching Authority mailed Sep. 14, 2022 corresponding to PCT International Application No. PCT/EP2022/064695 filed May 31, 2022.

*Primary Examiner* — Esvinder Singh
(74) *Attorney, Agent, or Firm* — Henry M. Feiereisen LLC

(57) ABSTRACT

A production machine system includes a production machine having multiple axes and drives. Each drive adjusts a machine element relative to a further machine element with respect to an axis. The machine elements separate the drives from each other, with the drives and the machine elements forming a kinematic chain. A control facility controls the drives to move the machine element relative to the further machine element. A model of the machine element is stored in the control facility and comprises a model parameter of the machine element. A measuring equipment determines a path describing a specific point assigned to the machine element during movement of the machine element. An analysis equipment analyzes the specific path and a correction equipment corrects the model parameter based on the analysis result. To determine the specific path, several, in particular all axes are moved successively starting from a base along the kinematic chain.

9 Claims, 1 Drawing Sheet

(58) Field of Classification Search
CPC .................. B25J 13/089; B25J 19/022; G05B 2219/39014; G05B 2219/39024; G05B 2219/39033; G05B 2219/39026; G05B 2219/39027; G05B 2219/39028; G05B 2219/41099; G05B 2219/39192; G05B 2219/40526; G05B 2219/40527; G05B 2219/49087
See application file for complete search history.

(56) References Cited

U.S. PATENT DOCUMENTS

| | | | | |
|---|---|---|---|---|
| 2021/0039259 | A1 | 2/2021 | Duprez et al. | |
| 2021/0129339 | A1* | 5/2021 | Pipe-Mazo | B25J 13/088 |
| 2022/0203544 | A1* | 6/2022 | Jiang | B25J 9/1684 |

FOREIGN PATENT DOCUMENTS

| | | | | |
|---|---|---|---|---|
| EP | 0615110 | A1 | 9/1994 | |
| EP | 1274546 | A1 | 1/2003 | |
| EP | 3287244 | A1 * | 2/2018 | B25J 9/1641 |
| EP | 3531062 | A1 | 8/2019 | |

* cited by examiner

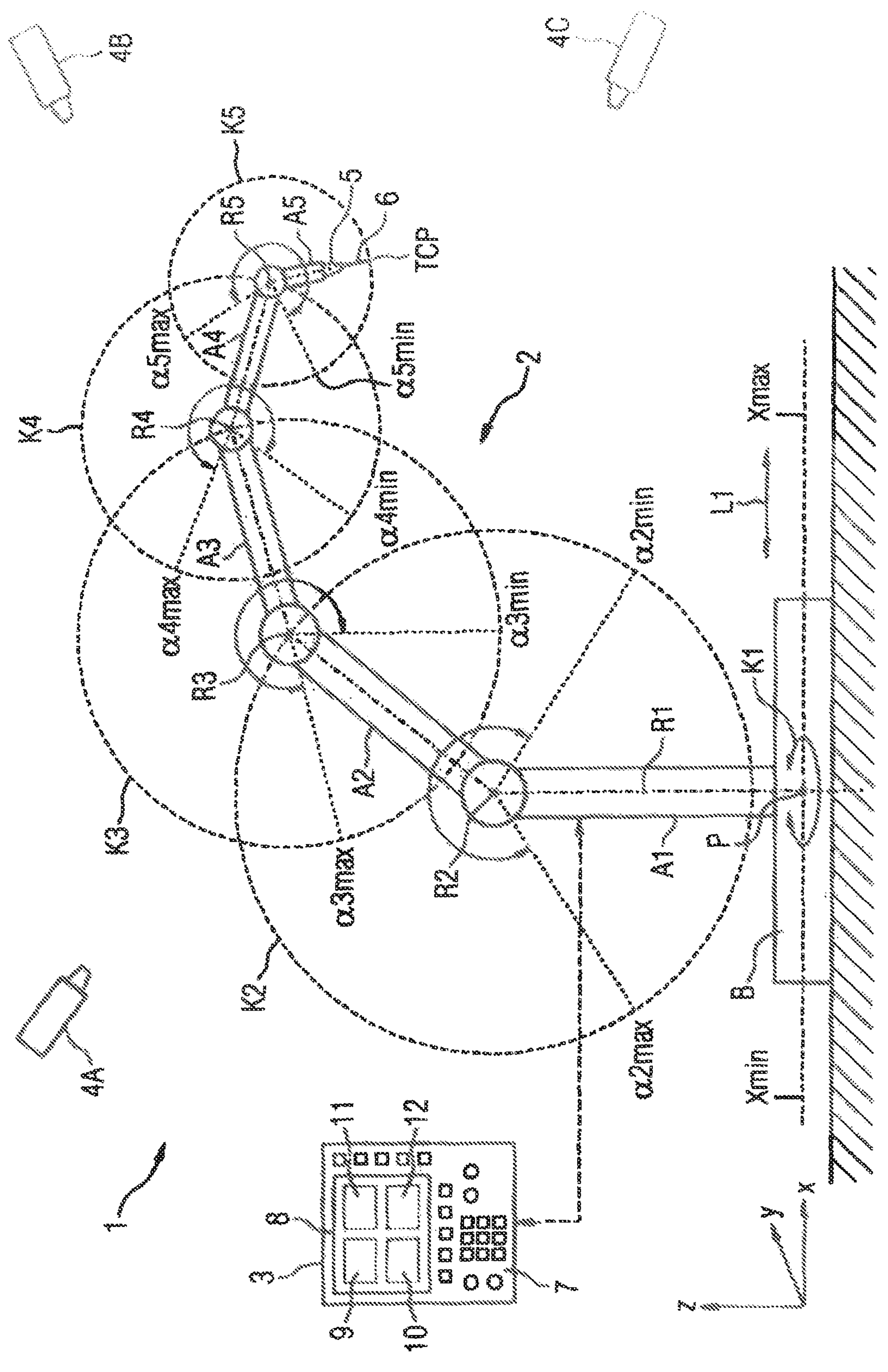
4B
4C
K5
5
R5
A5
6
TCP
α5max
A4
α5min
2
K4
R4
α4min
A3
L1
Xmax
α2min
α4max
α3min
R3
K1
R1
K3
A2
R2
P
A1
α3max
K2
B
α2max
Xmin
4A
11
12
1
8
3
7
9
10
z
y
x

AUTOMATED CALIBRATION OF A PRODUCTION MACHINE

CROSS-REFERENCES TO RELATED APPLICATIONS

This application is the U.S. National Stage of International Application No. PCT/EP2007/064695, filed May 31, 2022, which designated the United States and has been published as International Publication No. WO 2023/274643 A1 and which claims the priority of European Patent Application, Serial No. 21182869.4, filed Jun. 30, 2021, pursuant to 35 U.S.C. 119 (a)-(d).

BACKGROUND OF THE INVENTION

The invention relates to a production machine system, comprising a production machine, having at least one first position-controlled drive by means of which at least one first machine element can be adjusted relative to a further machine element with respect to an axis, a control facility for controlling the position-controlled drive for moving the first machine element relative to the further machine element, and a model of the first machine element which is stored in the control facility and which contains at least one model parameter of the first machine element.

Furthermore, the invention relates to a production machine and a control facility of such a production machine system.

Furthermore, the invention relates to a method for calibrating such a production machine system.

In addition, the invention relates to calibration software for performing the above method.

The person skilled in the art understands a production machine to be a machine used for the purpose of automated production. This includes, in particular, production machines, machine tools or robots. A production machine that is used in connection with the invention comprises at least one position-controlled axis, so that at least one first machine element that is directly connected to the drive can be adjusted relative to a second (further) machine element of the production machine by means of a position-controlled drive that is assigned to the axis.

A production machine of a production machine system according to the invention, for example a machine tool or a robot, preferably comprises more than one, in particular at least five position-controlled axes, by means of which an end effector or a tool can be positioned and oriented in space.

In addition to the production machine, the production machine system comprises a control facility connected thereto that controls the position of the axis according to a program (control program) in a closed-loop manner.

Nowadays, machine tools or robots are controlled, for example, with the help of a control facility in the form of a CNC controller. In this case, the control facility "controls" the movements of machine elements on the basis of a parts program and thus the movements of a tool, which is introduced into the machine via a tool holding apparatus, for example, relative to a workpiece, which is also introduced into the machine. In this case, it is clear to a person skilled in the art that the term "control" is being used in the usual sense of the word and not "control" in the sense of control engineering. "Control" in this case primarily refers to the closed-loop position control of axes, which refers to closed-loop control processes in the sense of closed-loop control technology.

The parts program is at least predominantly composed of control commands that are read and interpreted by the control facility. The control facility controls the movements of the machine elements of the machine tool according to the control commands, and thus the movement of the tool relative to the workpiece.

In order to create a parts program, a CAM (Computer Aided Manufacturing) system generates, preferably in a standardized data format, movement information regarding the movements that are to be performed by the tool, and said system reads the information in from a downstream post-processor. On the basis of the movement information that is generated by the CAM system, the kinematics and machine data of the machine tool as well as the command set of the CNC controller and the command set of the PLC controller, the post-processor generates a parts program that is adapted for the respective specific machine tool on which the machining process is to take place, said parts program being in the form of control commands that are adapted to the specific control facility of the machine tool. In such a manner, the post-processor converts the movement information that is generated by the CAM system, preferably in a standardized data format, into control commands which can be read by the control facility and are adapted to the respective control facility.

In addition to the specifically available CNC command set, the post-processor takes into account the actual machine-specific conditions of the machine tool, such as, for example, kinematics, geometric proportions, maximum travel ranges of the drive axes and maximum speeds of the machine elements. This data is in the form of machine data. Furthermore, machine-specific PLC functionalities (Programmable Logic Control), such as, for example, lubrication, tool change, door locking, etc., are taken into account by the post-processor when generating the control commands, wherein the specifically available PLC functionalities are available to the postprocessor in the form of PLC command sets.

In order for the production machine to be able to perform a predetermined movement very accurately, a calibration is necessary.

The kinematics of a production machine, in particular a machine tool or a robot, describes the implementation and organization of the moving elements. Kinematics are used to determine how axial movements combine into the overall movement.

The description of the kinematics contains geometric parameters (lengths, angles, etc.). Due to manufacturing and assembly tolerances, the real values do not correspond exactly to the nominal values from the design.

Calibration refers to the determination of the various parameters of the mechanics of the real production machine in order to obtain a complete and accurate kinematic model of the machine. Calibration can reduce or minimize the existing inaccuracies of the model of the production machine.

The actual geometric dimensions are determined during the calibration of a kinematic system. Currently, this is a time-consuming and expensive step.

In the simplest case, the machine is operated uncalibrated. The control of the movements is performed using nominal values of model parameters of the machine which are stored in the control system and is therefore inaccurate.

There are a variety of providers and procedures for the identification of the model parameters by means of different measurement methods and sensor systems. The typical calibration method according to the prior art determines length deviations, zero-position errors, axial misalignments, etc. by evaluating a multiplicity of approached positions or poses and large equation systems having all parameters.

A method for calibrating a robot is known from EP0353585A2, wherein a multiplicity of reference positions are approached one after the other as a result of a program or by way of manual specifications or manual control of the robot, the axis angles of the machine axes are read out and evaluated, and correction values for the robot, i.e. for its model parameters, are calculated on the basis of the reference positions in conjunction with the determined axis angles.

Document EP1274546A1 describes a method for increasing the accuracy of the movements of a robot, wherein a tool that is carried by the robot is made to assume multiple positions that are generated by the controller, each position being determined by a measuring system, wherein a deviation arises between the generated position and the position that is determined by the measuring system. The generated positions or the positions that are determined by the measurement system are adjusted in order to form a first path and a second path, wherein a correction is determined by way of a path deviation between geometrically calculated positions in the respective path.

In the case of an industrial robot known from EP3287244A1, such deviations of the end effector from a programmed (ideal) movement path during the movement of the end effector along a path, which are mainly caused by cogging torques of the drives, are reduced. To this end, it is proposed:

- to perform a learning trip during which deviations of the actual path from the ideal path are determined,
- to determine by means of an inverse model of the industrial robot the causal disturbance torques for the deviations,
- to determine from the disturbance torques correction angles for the axis angles that are applied to the axes of the industrial robot,
- to operate the industrial robot while taking into account the correction angles.

In the case of industrial robots, paths that are programmed in this manner can be adhered to much more accurately than in the case of conventional industrial robots.

An object of the present invention is to simplify the calibration of a production machine having at least one position-controlled drive or at least one position-controlled axis.

SUMMARY OF THE INVENTION

This object is achieved by a production system, comprising:

- a production machine, having at least one first position-controlled drive by means of which at least one first machine element (directly connected to the drive) can be adjusted relative to a further machine element with respect to an axis,
- a control facility for controlling the position-controlled drive so as to move the first machine element relative to the further machine element,
- a model of the first machine element which is stored in the control facility and which comprises at least one model parameter of the first machine element,
- measuring equipment for determining a path, which describes a specific point that is assigned to the first machine element during a movement of the first machine element,
- analysis means for analyzing the specific path,
- correction means for correcting the model parameter based on the analysis result,
- wherein the production machine comprises multiple axes and drives, which are separated from each other in each case by at least one machine element, and
- wherein the drives and machine elements form a kinematic chain, characterized in that
- in order to determine the respective path, the drives are moved one after the other starting from a base (B) along the kinematic chain.

Furthermore, the object is achieved by a production machine for such a production machine system.

Furthermore, the object is achieved by a control facility for such a production machine system.

Furthermore, the object is achieved by a method for calibrating a production machine system, wherein the following steps are performed by means of a control facility which is comprised by the production machine system:

- determining an axis of the production machine, said axis being provided for moving an end effector,
- determining a travel range for calibration for the determined axis,
- moving the axis along the determined travel range for the calibration,
- determining and analyzing of a path of at least one point that is assigned to a machine element that is moved by the movement of the axis,
- correcting a model parameter for the machine element depending on a result of the analysis for a model of the production machine which is stored in the controller, wherein
- the method is performed for multiple, in particular all the axes that are involved in the movement of the end effector,
- the axes are moved one after the other, and
- the axes are moved one after the other in a sequence along a kinematic chain, starting from a fixed base of the production machine.

Furthermore, the object is achieved by calibration software for performing such a method.

In contrast to previous calibration methods, in which length deviations, zero-position errors, axial misalignments, etc. are determined by the evaluation of a multiplicity of approached positions or poses in connection with large equation systems having a multiplicity of parameters, in the simplest case in the case of the procedure according to the invention, each machine axis is moved exactly once for the calibration. The calibration method can therefore be carried out within a short time and still leads to very good results. The associated computational effort is also limited compared to previous methods.

A production machine according to the invention may comprise one or more linear axes. A movement that is performed by means of a linear axis is at least approximately a linear movement and the described path ideally corresponds to a straight line.

Furthermore, a production machine according to the invention can also comprise one or more rotary axes and the movement that is performed in each case with them corresponds at least approximately to a circular movement or the described path corresponds to a circular path.

Thus, the invention can be applied to production machines that comprise linear axes as well as to production machines that comprise rotary axes, as well as to production machines having a combination of linear and rotary axes.

The axes that are relevant in this context to the invention are in particular the axes of the production machine that are involved in the movement of an end effector or a tool for machining or manufacturing a workpiece. Auxiliary drives or auxiliary axes, for example for moving a safety door, are excluded from this.

An end effector is understood to be the machine element of the production machine that achieves the effect which is intended for the production machine. For example, this could be a tool in the case of a machine tool or a gripper in the case of a robot. In robotics, the end effector is generally referred to as the last element of the kinematic chain of the robot.

In connection with the invention, a tracking interferometer, in particular a laser tracker, is preferably used as measuring equipment for recording the path. This allows the relevant path to be recorded with a high degree of accuracy. Advantageously, the laser tracker is installed in the edge region of the working area of the relevant machine and data is generated in the three-dimensional space.

For the measurement of the path, a machine element of the production machine may be specifically provided with a marking that is intended for this purpose, for example a dot painted on the outside of a machine element or a marker pen which has a pointed end and is attached to the outside of a machine element. However, it is also possible that a prominent point that is already present on the machine is selected as the point whose path is recorded according to the invention. Such a prominent point can be, for example, a corner point of a machine element, a screw head, a shaft end or the like. Essential here is simply that the prominent point be able to be clearly recognized during the movement of the axis and tracked during movement. In addition, it is also possible that the relevant point is assigned to the machine element which is moved by the movement of the axis, but is not itself part of that machine element. For example, a laser could be attached to the machine element which projects the relevant point onto a projection surface which is outside the machine element. Essential here is simply that the relevant point reflects the travel movement of the relevant axis or the relevant machine element.

In the case of production machines having axes that can be adjusted (moved), it is usual for a maximum travel range (hereinafter also referred to as a maximum traveling distance) to be specified for these axes. As a rule, said maximum travel range is fixedly defined by the machine mechanics and determined, for example, by means of mechanical or electronic end stops. The end stops determine a minimum axis position or a minimum axis angle and a maximum axis position or a maximum axis angle for the relevant axis, wherein the maximum travel is also specified accordingly. Endlessly rotatable rotary axes which do not have end stops thus have a maximum travel range of 0° to 360°.

The minimum and maximum axis positions or axis angles of the adjustable axes are determined in the usual manner when the production machine is commissioned and said axis positions or axis angles are stored in the control facility.

In addition to the maximum travel range, axes of a production machine according to the invention can also have a special "travel range for the calibration." Logically, this is less than or equal to the maximum travel range for the respective axis. If a travel range other than the maximum travel range is to be specified for a specific axis for the calibration, the minimum and maximum can also be defined for this at the time of commissioning and said minimum and maximum stored in the control facility. In particular, the limit values must be selected in such a manner that collisions between parts of the production machine can be excluded during the movement of the relevant axis within the thus defined maximum travel range for the calibration.

In the case of specific machines, it may be sufficient in order to record the path for a relevant axis to be moved over only a part of its maximum possible travel range or of its maximum travel range which is specified for the calibration.

Although even relatively short traveling distances are sometimes sufficient in order to detect specific inaccuracies in the model of the machine and to readjust the corresponding machine parameters, better results are usually achieved when the relevant axis is moved over a larger range, in particular the maximum travel range or the maximum travel range which is specified for the calibration.

Preferably, therefore, the invention provides that the relevant axis for recording the path is moved over at least a substantial part of its maximum travel range, in particular over the maximum travel range of said axis or the maximum travel range which is specified for the calibration. For example, the axis first assumes the minimum axis position or the minimum axis angle and is then moved—while the resulting path is recorded-until the maximum axis position or the maximum axis angle is reached. In the case of an endlessly rotatable rotary axis, for example, this is the range from 0° to 360°.

Naturally, in connection with the invention it is also possible to move the axis in the opposite direction of movement. In this manner, the axis can be moved starting from a maximum axis position or a maximum axis angle in the direction of the minimum axis position or the minimum axis angle.

Furthermore, in order to increase accuracy, it is also possible to move a relevant axis multiple times, in particular both in the positive and in the negative direction of movement, and to record the resulting paths. Using the data obtained, it is possible to determine, for example, an averaged path in which specific errors, such as measurement errors, are averaged out.

Production machines, in particular machine tools or robots, usually comprise multiple axes and thus multiple drives, which are separated from each other in each case by at least one machine element, wherein the drives and machine elements form a kinematic chain.

Thus, for example, an industrial robot often comprises a base which is location-fixed or can be moved along linear axis and a robotic arm that usually pivots about a vertical (first) axis is attached to said base. The robotic arm itself comprises a series of rigid (arm) links which are connected to each other by pivot joints, wherein the joints can be adjusted by controlled drives. The joints and drives form the (rotary) axes of the robot. As a result, the free end of this "link chain" is freely movable and can be equipped with an end effector, in particular a tool or gripper, so as to perform production work.

The arrangement of the drives in a kinematic chain means that when a specific drive of the machine is adjusted in the kinematic chain (viewed from the base), subsequent drives change their situation or position, even though said drives themselves are not adjusted (moved or driven).

During the adjustment of a drive, the path of a machine element that is moved by the drive, for example an arm link, is advantageously recorded for a point of the machine element which is at least approximately on an axis of a subsequent drive in the kinematic chain. Such a point can be determined, for example, by a specific corner or edge, a screw, a shaft end or any other prominent part of the machine element that is already present on the machine. Alternatively, a corresponding marking may have been placed or attached to a suitable place on the machine specifically for the purpose mentioned.

In addition, it is also possible for not only the path of one point, but the paths of multiple points to be detected and recorded simultaneously as the axis is adjusted. In particular, this makes it easier to detect torsions in the mechanics of the machine, in particular if the points under consideration are on opposite sides of a machine element, for example an arm link.

In the case of the calibration according to the invention, the machine axes that are provided for this purpose are preferably moved individually one after the other. However, it is also possible to move multiple axes simultaneously and to record the paths of one or more points of the machine that are thus moved. This speeds up the calibration process. However, the movement paths are then no longer just straight lines and circles, but can also result in more complicated geometrical structures, for example cycloids in the case of the simultaneous movement of two rotary axes. However, this usually increases the computational effort in the case of the subsequent evaluation.

With regard to the calibration of the machine and the thereby achievable higher accuracy of the intended movements, the position and orientation of the individual axes relative to each other are of particular importance. This means that the axis distances and orientations between the axes must be recorded particularly accurately. This can be achieved by ensuring that the points whose paths are recorded are on or at least close to the axes of the machine.

Furthermore, the position and orientation of an end effector or a tool holder are of particular interest for the accuracy of a machine. Therefore, one embodiment of the invention provides that the specific point is at least approximately determined in the area of the end effector or the tool holder of the production machine. In this manner, the corresponding path can also be determined for this specific part of the machine and one or more associated machine parameters can be readjusted. It is also particularly advantageous to track the path of the tip of a tool that is attached to the end effector, the so-called Tool Center Point (TCP).

The procedure according to the invention is characterized in particular by the fact that an operator only has to give the machine a specific command to start the calibration, for example a corresponding input on an HMI of the controller, and the calibration can then be performed at least largely automatically. In particular, in the case of a preferred embodiment of the invention, programs or manual inputs are not required in order to approach specific reference points with the machine. It is advantageous, following a start command, to actuate all the axes that are involved in the positioning of an end effector or a tool holder preferably individually one after the other, and to adjust said axes with respect to a travel range that is specified for the calibration, in particular with regard to a relevant range of the maximum travel range of said axes. In each case, the path of at least one point that is assigned to a machine element that is moved by virtue of the axis being moved is determined and analyzed, in particular compared with an ideal path or the deviations between the measured and the ideal path are determined. The individual axes are preferably moved one after the other in the sequence indicated by the kinematic chain of the relevant machine. In principle, however, said axes can also be moved in any sequence individually one after the other or respectively multiple axes can be moved in a predetermined or predeterminable combination simultaneously.

Since the traveling distances of the individual axes can already be specified before calibration begins, it is only necessary to call up calibration software that is stored in the control facility by means of a start instruction, in particular by means of manual input by an operator, in order to perform a calibration method according to the invention. In particular, the operator does not have to specify reference points or reference paths which are to be approached by the machine in the course of calibration.

The movement of the axes according to the sequence in the kinematic chain, starting with the axis closest to the base, has the advantage that all the axes that are in the kinematic chain in front of a specific axis are already calibrated when the relevant axis is moved. Possible errors of the previous axes have therefore already been corrected, so that the original deviations of said axes are no longer or at least no longer included to the extent otherwise obtained in the deviations that are determined from the adjustment of the prevailing axis.

Preferably, in connection with the calibration according to the invention, all axes are moved with respect to the maximum travel of said axes. Accordingly, the relevant axis first moves into the position with the minimum or maximum deflection and then moves into the position of the maximum or minimum deflection, during which the path of a selected point is determined. In the case of an endlessly adjustable rotary axis, these end positions can be, for example, the defined angular positions of 0° and 360°.

In a preferred embodiment of the invention, the "travel range for the calibration" of the axes and which is specified for the calibration of the machine is determined in each case in such a manner that no undesirable collisions occur between components of the production machine. The travel range for the calibration for a specific axis can therefore also depend on the prevailing axis positions of further axes of the production machine.

Particularly advantageously, the relevant production machine is provided with an automatic collision detection system which detects and prevents collisions in good time before they occur. The traveling distance of a specific axis, said traveling distance being specified for the calibration, is thus automatically and dynamically adapted to the respective situation by the control facility.

An alternative solution provides that the traveling distance of the relevant axes, said traveling distance being specified for the calibration according to the invention, is determined once and stored in the controller. In particular, it is determined for all axes in such a manner that collisions can be ruled out from the outset.

One embodiment of the invention provides that at least one, preferably all other axes, are brought into a predetermined starting position, for example a middle position (middle between maximum and minimum axis value) before a specific axis is moved in the course of the calibration. The starting position of the other axes is characterized in particular by the fact that no collisions occur during the movement of the specific axis. The starting position of a specific axis may be maintained unchanged for the time period of the calibration method during which this axis is not moved itself. However, the starting position of a specific axis can also depend on the axis that is being moved. Viewed over the entire calibration process, a specific axis can therefore have multiple predetermined starting positions. In particular, it is possible that, while a first axis is being moved to record the path of the relevant point, at least one other axis is also being moved simultaneously, in particular in the kinematic chain, in order to avoid a possible collision.

Advantageously, this may optionally enlarge the travel range that is designated for the first axis for the calibration.

On the one hand, the recording and evaluation of the maximum possible traveling distance leads to higher degree of accuracy in the case of the calibration overall. On the other hand, this measure potentially simplifies the effort for the user. The end positions of the adjustable axes are known in the case of production machines in any case after said production machines have been commissioned and said end positions are already stored in the controller.

If, in connection with the invention, a reduced travel range compared to the maximum travel range is to be determined for the calibration at least for one axis, then corresponding end positions for this axis can also be determined for the calibration by means of a one-time adjustment process and said end positions can be stored in the control facility. These end positions then determine the maximum travel range for calibration for the relevant axis. Provided that the travel range that is specified by the respective end positions is always to be used for the calibration, the user does not need to worry about this. If necessary, all that the user needs to do to perform the calibration is to execute the appropriate start command. The process then takes place automatically without any further input from the user. The effort for the user is therefore kept to a minimum. In particular, the calibration is thus carried out without the specification of a movement program or reference points that are to be approached.

BRIEF DESCRIPTION OF THE DRAWING

The invention is described and explained in more detail below in an exemplary manner on the basis of an exemplary embodiment. It is shown in FIG. 1 a production machine system according to the invention. Furthermore, the method according to the invention Is explained with the aid of FIG. 1.

DETAILED DESCRIPTION OF PREFERRED EMBODIMENTS

FIG. 1 shows a production machine system in the form of a robot system 1. The robot system 1 comprises a production machine in the form of an articulated arm robot 2, which is controlled by means of a control facility connected thereto in the form of a CNC controller 3. Furthermore, the robot system 1 comprises multiple laser trackers 4A to 4C, by means of which the positions of prominent points of the robot 2 can be determined accurately in the three-dimensional space and tracked during the movement of the robot 2.

Furthermore, the robot system 1 comprises multiple software applications (apps) which can be run on the CNC controller 3 and executed if required.

For the control and exact positioning of the robot 1, a model of the robot 2 in the form of model parameters 9 is stored in the CNC controller 3. The model parameters 9 allow the kinematics of the robot 2 to be accurately described. In particular, the model parameters 9 indicate the number of axes of the robot, the orientation of the axes relative to each other, as well as the exact geometric dimensions of essential components of the robot 2 and the distances between adjacent axes (center distances).

The robot 2 according to the exemplary embodiment comprises a linear axis L1, by means of which a base B can be moved with respect to a Cartesian coordinate system x, y, z in the x-direction between the points $x_{min}$ and $x_{max}$.

In addition to the base B, the robot 2 comprises a robotic arm which is rotatably connected to the base B by the arm links A1 to A5. There is a joint in each case between two adjacent arm links, by means of which in each case one of the (arm) links can be pivoted with respect to the other. In the exemplary embodiment, the joints are represented by the horizontally oriented rotary axes R2 to R5.

In addition, the robot 2 comprises a rotary axis R1, which is oriented vertically, i.e. parallel to the z-axis, and about which the robotic arm can be pivoted at any angle. This means that in the case of the R1 rotary axis any angle from 0° to 360° C. an be set. In principle, the robotic arm can be rotated endlessly about R1.

The linear axis L1 and the rotary axes R1 to R5 form a kinematic chain. As a result, the drives of the axes that follow in the chain are changed in terms of their position and/or orientation in space, in particular by adjusting an axis, without said drives having to be adjusted or moved themselves.

The model parameters 9 of the robot 2 are recorded, for example, during commissioning. Said parameters include the geometrical dimensions of relevant robot components, in particular the lengths of the arm links A1 to A5 and the distances of adjacent rotary axes. The position and orientation of the axes relative to each other are also included in the model parameters.

Furthermore, during the commissioning, the minimum and maximum axis positions $x_{min}$ and $x_{max}$ of the linear axis L1, or the minimum and maximum axis angles a$\mathbf{2}_{min}$, $\mathbf{2}_{max}$ . . . a$\mathbf{5}_{min}$, a$\mathbf{5}_{max}$ for the rotary axes R2 to R5 are also defined.

The thus defined minimum and maximum axis positions $x_{min}$ and $x_{max}$ of the linear axis L1 or the minimum and maximum axis angles a$\mathbf{2}_{min}$, a$\mathbf{2}_{max}$ . . . for the rotary axes R2 to R5 define in each case the maximum travel range (traveling distance) for the relevant axis.

With regard to the calibration method according to the invention, in addition to the minimum and maximum axis values (axis positions or axis angles), minimum and maximum axis values for the calibration can also be specified in the case the robot 2. This means that a smaller travel range than the maximum travel range can be defined for the relevant axis specifically for the calibration process, i.e. for the calibration process. Preferably, however, the axes are moved over their maximum travel range for the calibration, in particular if collisions can be ruled out.

Advantageously, the calibration method according to the invention largely takes place automatically. According to a preferred embodiment, an operator of the CNC controller 3 only needs to start a corresponding calibration application (not shown) in conjunction with the control elements 7 and a display 8. This triggers the following described method steps:

In a first method step, a travel range for the calibration is determined for the linear axis L1. As is apparent from FIG. 1, collisions between machine elements caused by the movement of the linear axis L1 can be ruled out. The travel range for the calibration is therefore defined for the linear axis L1 as the visible range between a starting position $x_{min}$ and an end position $x_{max}$.

In a second method step, the linear axes L1 are moved from the starting position $x_{min}$ at a predetermined speed to the end position $x_{max}$. In so doing, in a third method step, at least one of the laser trackers (tracking interferometers) 4A to 4C is used to record the position of the point P or additionally or alternatively the position of the point R2 during the movement. Ideally, the point P or the point R2 should move along a straight line which is parallel to the X-axis.

In a fourth method step, the points that are recorded by the laser trackers 4A to 4C are fed to a laser tracker App 10 which is running in the CNC controller 3 and analyzed. In particular, the Laser Tracker App 10 compares the movement paths (paths) of the points P and R2 which are determined by the laser trackers 4A to 4C in the 3-dimensional space with ideal paths for the movement which is performed. From the deviations between the recorded paths and the ideal paths, correction values for the model parameters 9 of the robot 2 which are stored in the CNC controller 3 are determined in a fifth method step. The correction values may concern, for example, the orientation of the axis L1 in space, which may not be exactly parallel to the x-axis of the base coordinate system x, y, z, or the measured values may result in a different distance between the points P and R2 than the one originally stored for this purpose in the controller 3.

Analogous to the procedure with regard to the linear axis L1, the following procedure is also followed for the rotary axes R1 to R5. First, a travel range for the calibration is determined in each case for the relevant axis and the axis is moved according to the respective travel range for the calibration. During the travel movements, in each case the paths of predetermined prominent points are recorded, compared with ideal paths, and derived from this are correction values or corrected values for model parameters of the robot model which is stored in the controller 3, said model parameters being stored in the controller 3.

There are various options to choose from regarding possible travel ranges for the calibration of the individual axes L1, R1 to R5 of the robot 2.

During the calibration, it is advantageous to move a specific axis or all the axes along their maximum traveling distance and to record the resulting movements.

However, it is also possible that for at least specific axes, not the maximum possible travel range, but a specific, limited travel range is specified for the calibration.

This limited travel range for the calibration can be defined for the respective axis before the calibration process begins and stored in the CNC controller 3 by means of corresponding parameters. In particular, a maximum traveling distance for the calibration can be specified by specifying corresponding starting and final values. For example, for the axis L1, this could be the range between points $x_{k,min}$ and $x_{k,max}$ (not shown), or for the rotary axis R2, it could be the angular range between the axis angles $a2_{k,min}$, $a2_{k,max}$ (not shown).

A limited travel range for the calibration compared to the maximum travel range of an axle may also result from the fact that the controller 3 has means of automatic collision avoidance, by way of which collisions are detected in good time before they occur. As a result, the maximum travel range for the calibration of a specific axis can be automatically limited for the calibration to a maximum possible, collision-free travel for that axis.

Possible collisions usually depend on the axis positions of all or at least multiple axes of the robot 2. Conversely, a collision caused by the movement of one axis can often be prevented by positioning other axes-before or during the movement of one axis—in such a manner that no collision occurs. In the exemplary embodiment, while the rotary axis R2 could be moved from $a2_{min}$ to $a2_{max}$, the axis R3 could be simultaneously moved from $a3_{max}$ to $a3_{min}$.

A further embodiment of the invention provides that before a specific axis is moved in the course of calibration according to the invention, all other axes are brought into a predetermined position, for example a "middle position", thus preventing collisions.

In a preferred embodiment of the invention, when, during the movement of a specific axis, all other axes are automatically positioned before or during the movement of the one axis in such a manner that no collisions occur. This means that the entire calibration process—apart from a manual start—can be carried out automatically.

In the case of a preferred embodiment of the invention, all the axes L1, R1 to R5 that are involved in the movement of the end effector of the robot 2 in the form of the tool 6 are moved for the calibration one after the other at least once in the mentioned sequence, in particular along their maximum traveling distance or their maximum traveling distance that is specified for the calibration. The rotation of the R1 axis leads to a circular movement (not shown) of the arm links A1 to A5 as well as the tool holder 5 and tool 6 about this rotation axis R1. Here it is useful to record and analyze the movement paths (ideally circular paths) of the points R2 to R5 and the TCP (Tool Center Point) which are apparent from FIG. 1. The axis R1 rotates advantageously in this case from an angular position of 0° by 360° to the angle position of 360°.

Subsequently, the arm link A2 is pivoted about the rotation axis R2. For the sake of clarity, R2 refers to both the rotary axis R2, which runs in the y-direction, i.e. into the drawing plane, and to the point R2 on this axis, which is apparent from the drawing. The point R2 indicates, for example, the center point of the position of the joint between the arm links A1 and A2, said center point being visible on the outside of the robotic arm. R2 can be a prominent point on the robotic arm that can be distinguished from other points, but the point R2 can also be a marker which is attached to the robotic arm specifically for the calibration and can be easily detected and located, in particular by the laser trackers 4A to 4C.

The statements regarding the movement of the rotary axis R2 or the recording of the path of the point R2 also apply analogously to the rotary axes R3 to R5 and to the associated points R3 to R5, which are apparent in FIG. 1.

During the pivot movement of the arm link A2 about the rotary axis R2, the rotary axis R2 (i.e. the relevant drive) is adjusted from an initial angle position of $a2_{min}$ to an end angle position of $a2_{max}$, i.e. shifted or moved. Ideally, the point R3 moves about R2 on a circular path K2. The movement of the point R3 along the relevant circular arc is detected by the laser trackers 4A to 4C and fed to the CNC controller 3. The covered orbit is then available as a set of measuring points in the CNC controller 3 and can be analyzed by means of the CNC controller 3, in particular by means of analysis equipment that is available in the CNC controller in the form of an analysis app.

Based on the deviations of the measured arc of K2 from the corresponding ideal arc, conclusions can be drawn about model parameters of the robot 2. For example, deviations in the position and orientation of the axis R2 with respect to the base coordinate system x, y, z or deviations in the distance between points R2 and R3 can be detected. The model parameters which are also stored in the robot model in the CNC controller 3 can be corrected in this manner.

In particular, the rotational movement of the point R2 describes an orbit that is theoretically an ideal circle. The measured path can be analyzed by means of mathematical methods, for example the least-squares-fit method. From the deviations, individual deviations or errors of specific model parameters can be purposefully determined and corrected:

if, for example, the center point of the measured circle is not at the point specified for it, this can be corrected by offsetting the axes.

if, for example, the radius of the measured circle is larger or smaller than expected, the corresponding arm length can be corrected.

if the determined circular plane is at an angle to the expected (ideal) circle plane, this indicates a less than ideal installation position of the relevant joint. Correction offsets can also be determined in this regard.

The calibration process that is described above as an example can be deviated from in many ways within the scope of the invention. The axes L, R1 to R5 can thus be moved in a different sequence, in principle in any sequence. It is also possible for multiple axes to be moved simultaneously and the paths of prominent points to be recorded. Also, when moving at least one axis, the paths of multiple points can be recorded simultaneously and then analyzed. In particular, multiple points that affect a specific joint can be recorded simultaneously, for example the two endpoints of a joint shaft. Furthermore, the individual axes can be moved in any direction and multiple times one after the other. Moreover, it is also possible that individual axes are not moved over their maximum possible travel range, but only over a part of the maximum possible travel range. In addition, during the calibration process, specific axes may sequentially assume multiple predetermined axis positions one after the other, and other axes will subsequently be moved along their traveling distance that is specified in the scope of the calibration. For example, the axis R1 can initially be oriented in such a manner that the rotary axes R2 to R4 are oriented into the drawing plane, I.e. in the y-direction, as shown in FIG. 1. The rotary axis is subsequently pivoted by 90° so that the rotary axes R2 to R5 are oriented in the x-direction, and the calibration process is repeated (with regard to the other axes R2 to R5) for this axis position of the rotary axis R1.

The above list shows only a few possibilities by which the calibration method according to the invention can be expanded or supplemented. This list is therefore not to be understood exhaustively and can be supplemented by a multiplicity of further variants without leaving the scope of protection of the invention.

In addition to the determination or correction of the pure geometry parameters of the robot 2, other mechanical effects can also be determined and corresponding model parameters corrected in a further variant of the invention. For example, the sag of an elastic mechanism due to gravity leads to correspondingly deformed circles. From the type of deformation and the degree of deviation from the target circle, stiffness in the axes and joints can be inferred.

A particular advantage of the invention lies in the fact that by virtue of a one-time call-up or start of the calibration on the controller 3, this can take place largely automatically for the robot 2, i.e. without further intervention by an operator. In particular, calibration does not require a multiplicity of reference points to be approached and evaluated. This simplifies both the effort for the user and the effort involved in creating appropriate calibration software and thus programming the robot 2.

In particular, the calibration software can be programmed in such a manner that it can be run on a multiplicity of different controllers which each control different production machines. It is advantageous in this case that no further manual operating operations are required after installation and calling up the calibration software. The calibration software automatically extracts the data that is required for the calibration of the relevant production machine (number, position and orientation of the axes, travel ranges, etc.) from the respective controller.

The invention claimed is:

1. A production machine system, comprising:

a production machine comprising multiple axes and multiple position-controlled drives connecting machine elements, with the drives and the machine elements forming a kinematic chain;

a control facility storing a model of the machine elements, said model comprising a model parameter of the machine elements, the control facility configured to before calibration, move the multiple axes to predetermined positions which assures that no collisions between machine elements occur, set for each of the axes a respective range for a maximum excursion, move a first machine element connected between a first axis and a second axis within the respective range defined for the first axis and record an actual movement of the second axis of the first machine element with a tracking interferometer, said actual movement of the second axis of the first machine element performing a circular arc around the first axis, correct the model parameter for the first machine element based on a comparison of the model of the production machine stored in the control facility with the actual movement of the second axis of the first machine element, move a further machine element connected downstream of the second axis between the second axis and a further axis within the respective range defined for the second axis and record an actual movement of the further axis of the further machine element with the tracking interferometer, said actual movement of the further axis of the further machine element performing a circular arc around the second axis, correct the model parameter for the further machine element based on a comparison of the model of the production machine stored in the control facility with the actual movement of the further axis of the further machine element, repeat moving, recording and correcting for each additional further downstream-connected machine element successively along the kinematic chain until all axes involved in a movement of an end effector have been calibrated.

2. The production machine system of claim 1, wherein the production machine further comprises a base axis that is a linear axis, and the control facility is further configured to:

prior to moving the first machine element, move a base machine element along the base axis within the respective range defined for the base axis, and record an actual movement of the first axis of the base machine element with the tracking interferometer, said actual movement of the first axis of the base machine element performing a linear movement along the base axis, and correct the model parameter for the base machine element based on a comparison of the model of the production machine stored in the control facility with the actual movement of the first axis of the base machine element.

3. The production machine system of claim 1, wherein the drives are respectively moved over at least a substantial part of a maximum travel range for each respective drive.

4. The production machine system of claim 1, wherein an actual movement of a still further axis of a still further machine element is a movement of the and effector or a tool holder of the production machine.

5. The production machine system of claim 1, wherein the production machine is configured as a machine tool or robot.

6. The control facility for the production machine system set forth in claim 1.

7. A method for calibrating a production machine with multiple axes and multiple position-controlled drives connecting machine elements, the method executed by a control facility of a production machine system and comprising:

before calibration, moving the multiple axes to predetermined positions which assures that no collisions between machine elements occur, setting for each of the axes a respective range for a maximum excursion, moving a first machine element connected between a first axis and a second axis within the respective range defined for the first axis and recording an actual movement of the second axis of the first machine element with a tracking interferometer, said actual movement of the second axis of the first machine element performing a circular arc around the first axis, correcting a model parameter for the first machine element based on a comparison of a model of the production machine stored in the control facility with the actual movement of the second axis of the first machine element, moving a further machine element connected downstream of the second axis between the second axis and a further axis within the respective range defined for the second axis and recording an actual movement of the further axis of the further machine element with the tracking interferometer, said actual movement of the further axis of the further machine element performing a circular arc around the second axis, correcting a model parameter for the further machine element based on a comparison of the model of the production machine stored in the control facility with the actual movement of the further axis of the further machine element, repeating the moving, recording and correcting for each additional further downstream-connected machine element successively along a kinematic chain until all axes involved in a movement of an end effector have been calibrated.

8. The method of claim 7, wherein the model of the production machine describes an ideal circular path of the first machine element and the further machine element around the respective first and second axis.

9. A calibration software loaded into the control facility for controlling the production machine of the production machine system and stored on a non-transitory storage medium having instructions that, when executed by the control facility perform the method as set forth in claim 7.

* * * * *